United States Patent
Ernström et al.

(10) Patent No.: US 9,253,079 B2
(45) Date of Patent: Feb. 2, 2016

(54) HIGH PERFORMANCE LFA PATH ALGORITHMS

(71) Applicant: Telefonaktiebolaget L M Ericsson (publ), Stockholm (SE)

(72) Inventors: Lars Ernström, Palo Alto, CA (US); Alfred C. Lindem, III, Cary, NC (US); Pramodh D'Souza, San Jose, CA (US); Evgeny Tantsura, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 119 days.

(21) Appl. No.: 14/052,414

(22) Filed: Oct. 11, 2013

(65) Prior Publication Data

US 2015/0103671 A1     Apr. 16, 2015

(51) Int. Cl.
   *H04L 12/733* (2013.01)
   *H04L 12/703* (2013.01)
   *H04L 12/24* (2006.01)
   *H04L 12/705* (2013.01)

(52) U.S. Cl.
   CPC ............ *H04L 45/18* (2013.01); *H04L 41/0659* (2013.01); *H04L 45/122* (2013.01); *H04L 45/28* (2013.01)

(58) Field of Classification Search
   None
   See application file for complete search history.

(56) References Cited

U.S. PATENT DOCUMENTS 6,542,469 B1 *   4/2003   Kelley et al. .................. 370/238
2012/0195229 A1 *   8/2012   Chen .............................. 370/254

OTHER PUBLICATIONS

Bryant, Remote LFA FRR draft-ietf-rtgwg-remote-lfa-02 , May 2013.*
Atlas, A. , et al., *Basic Specification for IP Fast Reroute: Loop-Free Alternates, Network Working Group*, Sep. 2008, 32 pages.
Atlas, A. , et al., "An Architecture for IP/LDP Fast-Reroute Using Maximally Redundant Trees draft-atlas-rtgwg-mrt-frr-architecture-00", Jan. 5, 2012, 21 pages.
Bryant, S. , et al., "Remote LFR FRR draft-ietf-rtgwg-remote-lfa-03", Nov. 4, 2013, 23 pages.
Filsfils, C. , et al., "Loop-Free Alternate (LFA) Applicability in Service Provider (SP) Networks", Jun. 2012; 35 pages, Internet Engineering Task Force (IETF), RFC 6571.

* cited by examiner

*Primary Examiner* — Hoon J Chung
*Assistant Examiner* — Zhensheng Zhang
(74) *Attorney, Agent, or Firm* — NDWE, LLP

(57) ABSTRACT

A method is implemented by a network element to improve efficiency of loop free alternative (LFA) path computation by caching data from a shortest path first calculation for use in the LFA path calculation. The shortest path first calculation determines a shortest path from a source vertex to each vertex in a network topology graph representing the network in which the network element operates, where an endpoint for each shortest path is the shortest path vertex, and where each shortest path determined by the shortest path first calculation is stored.

20 Claims, 8 Drawing Sheets

HIGH PERFORMANCE LFA PATH ALGORITHMS

FIELD OF THE INVENTION

The embodiments of the invention relate to the field of network routing. Specifically, the embodiments relate to a method and system for efficiently calculating backup paths to be utilized for quickly rerouting data traffic in response to a failure of a primary path, by switching to the predetermined loop free alternative (LFA) or remote LFA backup paths.

BACKGROUND

Internet Protocol (IP) traffic can be routed across the Internet by using discovery and routing protocols that are executed by the nodes of the Internet such that they can determine optimal and loop free routes from any data traffic source to any data traffic destination using topology information exchanged between the nodes. Each node in the network utilizes the topology ascertained through the discovery protocols to construct forwarding tables that are consistent across the network. The process of arriving at these routes and forwarding tables can be called 'convergence.' The routes and forwarding tables are recalculated when there is a change in network topology. However, re-calculating these routes and tables can take time (i.e., long convergence time) during which some traffic may be blocked or lost.

IP and Multi-Protocol Label Switching (MPLS) Fast Reroute (FRR) technologies address the problem with the long convergence of routing protocols by providing backup paths, which are used when network failures occur. These technologies are important due to the increased use of IP transport for real time services such as video, voice and television and the increasing number of web services which all are expected to work without disruption.

The standard approach used in existing technologies, such as open shortest path first (OSPF)/intermediate system-intermediate system (ISIS)/label distribution protocol (LDP) loop free alternative (LFA), maximally redundant trees (MRT), border gateway protocol (BGP) fast reroute (FRR), and interior gateway protocol (IGP) is to gather network information using a routing/signaling protocol and based on that information compute the backup paths necessary to prepare for failures of adjacent links or nodes, and then to pre-provision the forwarding plane with those back-up paths. The forwarding plane is then able to react on a failure event and switch from a primary path to a back-up path without waiting for the routing protocol to gather updated network information and converge.

SUMMARY

A method is implemented by a network element to improve efficiency of loop free alternative (LFA) path computation by caching data from a shortest path first calculation for use in the LFA path calculation. The shortest path first calculation determines a shortest path from a source vertex to each vertex in a network topology graph representing the network in which the network element operates, where an endpoint for each shortest path is the shortest path vertex, and where each shortest path determined by the shortest path first calculation is stored. The method includes generating a candidate path set with each candidate path being a stored shortest path from a source vertex to the shortest path vertex joined with an edge originating at the shortest path vertex of the stored shortest path. Each candidate path is prioritized in a priority queue using a distance of each candidate path. A next candidate path is then selected and removed path from the priority queue in an iterative loop. A check is made whether the candidate path is a loop free alternative path using stored data from the shortest path first calculation. The candidate path is discarded where the candidate path is not a loop free alternative path. Where the candidate path meets applicable conditions, the candidate path is selected and stored as the LFA path, the first hop edge along the LFA path is stored, and a distance of the LFA path is stored. The method further checks whether the priority queue is empty, checks whether all shortest path vertices in the network topology have LFA paths and ends the LFA path calculation when the priority queue is empty or all shortest path vertices have LFA paths.

A network element executes the method to improve efficiency of loop free alternative (LFA) path computation by caching data from a shortest path first calculation for use in the LFA path calculation. In the executed method, the shortest path first calculation determines a shortest path from a source vertex to each vertex in a network topology graph representing the network in which the network element operates, where an endpoint for each shortest path is the shortest path vertex, and where each shortest path determined by the shortest path first calculation is stored. The network element includes at least one forwarding element to forward data traffic along a primary path until a network event and to forward the data traffic along the backup LFA path after the network event. The network element also includes a route processor coupled to the at least one forwarding element, the route processor configured to execute a primary path calculation module and a backup path calculation module. The backup path calculation module is configured to generate a candidate path set with each candidate path being a stored shortest path from a source vertex to the shortest path vertex joined with an edge originating at the shortest path vertex of the stored shortest path, to prioritize each candidate path in a priority queue using a distance of each candidate path, to select and removing a next candidate path from the priority queue, to check whether the candidate path is a loop free alternative path using stored data from the shortest path first calculation, to discard the candidate path where the candidate path is not a loop free alternative path, where the candidate path meets applicable conditions, to select and store the candidate path as the LFA path, to store the first hop edge along the LFA path, and to store a distance of the LFA path. The backup path module is further configured to check whether the priority queue is empty, to check whether all shortest path vertices in the network topology have LFA paths, and to end the LFA path calculation when the priority queue is empty or all shortest path vertices have LFA paths.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1A:
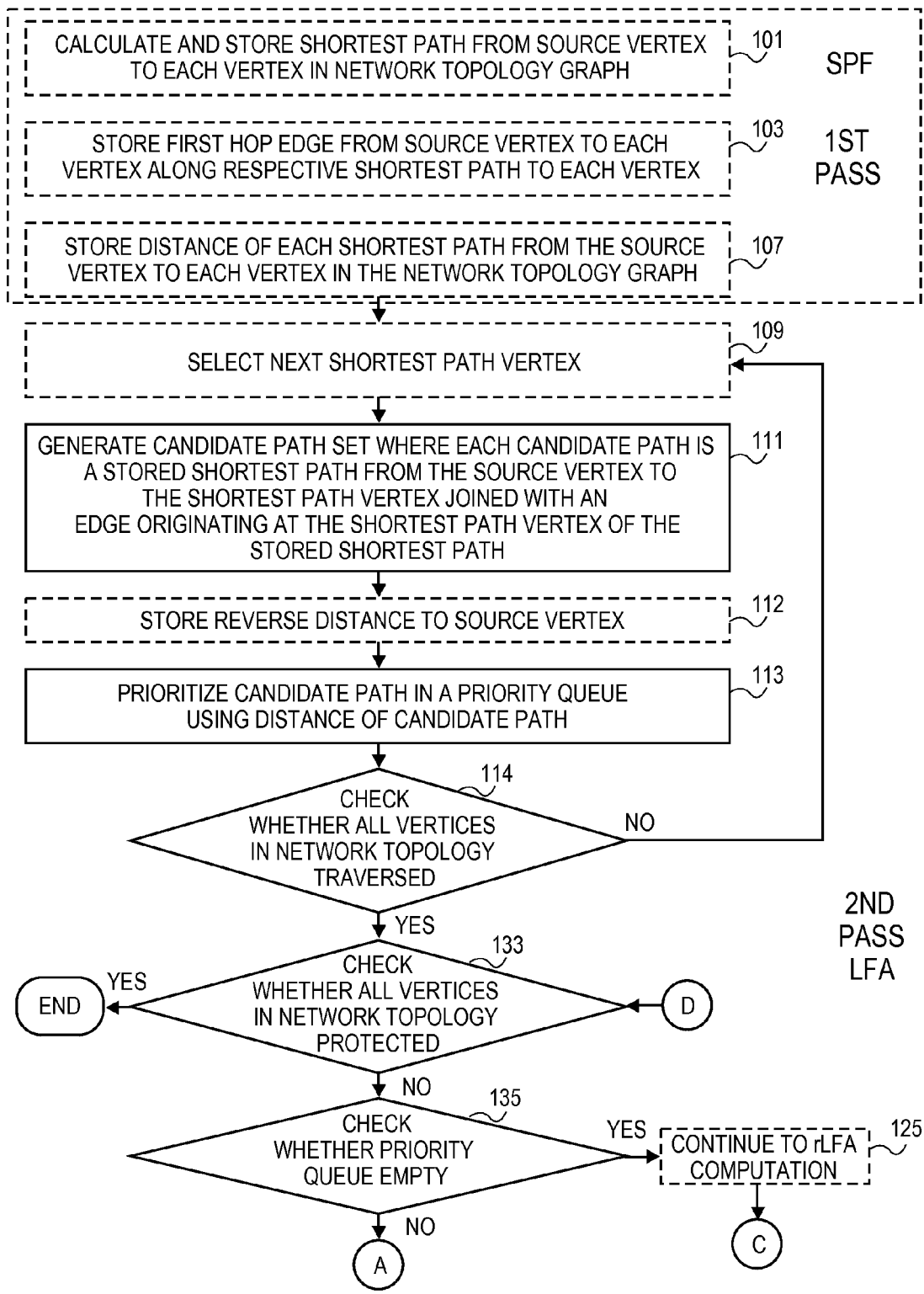
FIG. 1A is a flowchart of one embodiment of a process for optimized loop free alternative (LFA) backup path calculation.
Figure 1A:
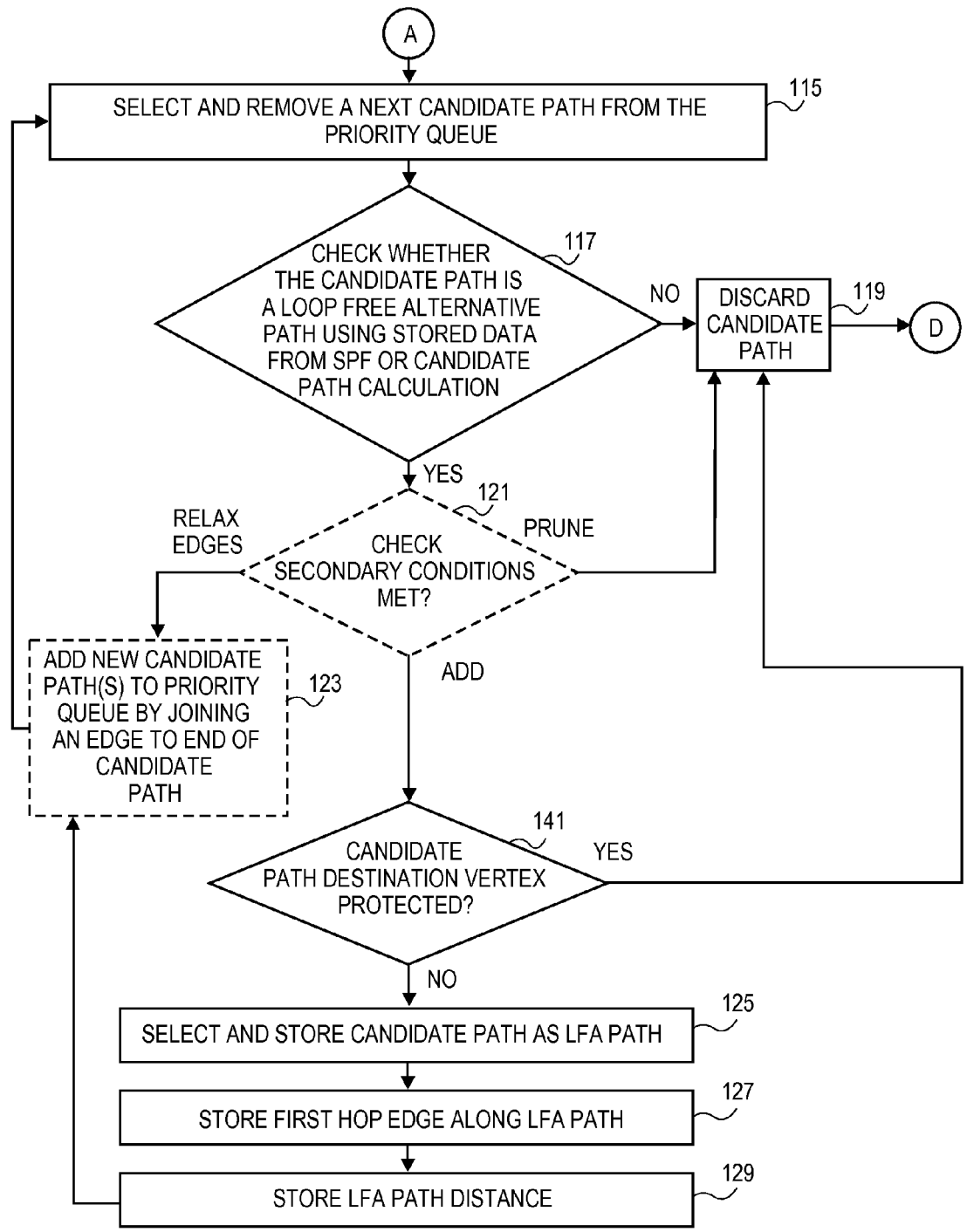

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). A 'set,' as used herein, refers to any positive whole number of items. The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

The embodiments of the invention described herein below provide a method and apparatus for use in connection with fast reroute for Internet Protocol (IP) and multi-protocol label switching (MPLS), media access control (MAC) routes or other addressing scheme used for communication in a data network. The method and apparatus support a control plane that keeps forwarding paths or next hops for both primary and back-up paths to all destination nodes. In a network consisting of a large number of routers it is of importance that efficient algorithms are applied in the network elements for the computation of the backup paths. Inefficient algorithms will limit the scale of the area of a protection domain, i.e. they limit the number of network elements that can participate in a routing domain where IP Fast Reroute (IPFRR) IPFRR protection is deployed. Algorithms for calculating the backup paths ensure that the back path is a loop free alternative (LFA) to a primary path. The calculation of backup LFA paths does increase the amount of computation, compared to the standard shortest path computation, by a factor proportional to the number of neighbor routers in the domain. For calculating remote backup LFA path algorithms there is a further increase in the amount of computation by a factor, in the worst case, proportional to the total number of network elements in the protection domain. The methods and apparatus described herein below improve the efficiency of computation of backup LFA paths.

Fast rerouting (FRR) technologies include the calculation of Loop Free Alternates (LFA) backup paths, using a neighbor router as backup, and remote backup LFA paths, using a remote node connected through for example a tunnel as backup, sometimes simply referred to as LFA and remote LFA, which are technologies used to provide Internet Protocol Fast rerouting (IPFRR) based on Interior Gateway Protocols (IGPs) such as open shortest path first (OSPF) and intermediate system—intermediate system (ISIS) protocols. An IGP running within a network element builds a database (e.g., a routing information base (RIB)), which tracks all links within the applicable network area. The process for determining backup LFA paths computes loop free alternate paths using the IGP database. Border gateway protocol (BGP) diverse path, BGP best external, and BGP add path are BGP technologies, which gives BGP routers the capability to distribute and learn multiple alternates for a single prefix and the ability to realize IPFRR. Examples may be discussed using specific routing and FRR technologies, however, one skilled in the art would understand that the principles, steps and structures of these examples are applicable to the other technologies.

IP and MPLS Fast Reroute technologies address the problem with the long time of routing protocols to converge across networks. The problem is addressed by providing backup paths, which are used when network failures occur. These technologies are important due to the increased use of IP transport for real time services such as video, voice and TV and the increasing number of web services which all are expected to work without disruption.

Specifically, the standard approach used in existing technologies, such as OSPF/ISIS/LDP LFA, MRT, BGP FRR, is to gather network information using a routing/signaling protocol and based on that information compute the backup paths necessary to prepare for failures of adjacent links or nodes, and then to preprovision the forwarding plane with those back-up paths. The forwarding plane is then able to react on a failure event and switch from a primary to a back-up path without waiting for the routing protocol to gather updated network information and converge.

However the disadvantages of the prior art include that the computation of backup LFA paths is inefficient. In a network consisting of a large number of routers it is of importance that efficient algorithms are applied in the routers for the computation of the backup paths. Inefficient algorithms will limit the scale of the area of a protection domain, i.e. limit the number of routers that can participate in a routing domain where IPFRR protection is deployed. Existing best practice algorithms for LFA increase the amount of computation, compared to the standard shortest path computation, by a factor proportional to the number of neighbor routers in the domain. For remote LFA the best practice algorithms increase the amount of computation by a factor, in worst case, proportional to the total number of routers in the protection domain. The embodiments described herein below radically improve the efficiency of computation of protection paths both for LFA and remote LFA.

The embodiments of the invention overcome these disadvantages by the introduction of a new process for computing LFA and remote LFA backup paths. The process is a modification of the Dijkstra shortest path algorithm comprised of three passes. Each pass uses a different set of candidate paths. Each set is prioritized as in the Dijkstra case by path distance to determine best protection paths in addition to the shortest paths.

The first pass of the process consists of the normal Dijkstra shortest path algorithm that calculates the unconditional shortest distance from a source node (i.e., a source vertex) to each destination node (i.e., destination vertex) in the network topology. The first pass computes the normal best paths used by the router in a stable network. Data is cached during this first pass to be used in subsequent passes.

In the second pass, the LFA backup paths are computed. The data cached during first pass is leveraged to generate LFA candidate paths subject to loop-free conditions and optional conditions, e.g. node protection, down stream, shared risk group and similar conditions. A separate distance measure, for loop free alternative paths, is used to determine the best LFA backup paths subject to applicable conditions. Also during the second pass, additional data is cached. The additional cached data is used in the third pass.

In the third pass of the process, which is optional, the remote LFA backup paths are computed for destinations that are not protected by LFA paths determined in the preceding second pass. The data cached during the calculation of the shortest paths and the LFA paths are leveraged to generate remote LFA candidates subject to loop-free alternative conditions and other optional conditions. A new distance measure is used to determine the best remote LFA paths subject to the applicable conditions.

Based on simulation of the process in the embodiments described herein, the effort of each of the second pass LFA and the third pass remote LFA computation effort on the same order of magnitude as the effort of the SPF computation, ranging from less than the SPF effort to a few times the SPF effort for networks with up to 10000 nodes. These numbers are dependent on the network topology and edge costs of the graph representing the network topology, as well as on the type of conditions applied in qualifying the protection paths.

The embodiments of the process enable the amount of computation for the backup LFA and remote LFA to be of the same order of magnitude as the shortest path computation providing higher computational efficiency compared to state of the art methods for which the computation times increase significantly faster as the number of neighbor routers or total number of routers within the protection domain increase.

FIG. 1A is a flowchart of one embodiment of a process for optimized loop free alternative (LFA) backup path calculation. The process efficiently computes the LFA and remote LFA backup paths. The process is an extension of the Dijkstra method for computing shortest paths from a given source vertex in a graph representing a topology of a network. In this description, the function opt_dist(U, V) denotes the optimal or shortest path graph distance from vertex U to vertex V. In addition path_dist(U→V) denotes the distance along, the not necessarily optimal path U→V. The process is applied to a network topology represented by a graph where each node or router in the network topology is represented as a vertex in the graph and communication links between the nodes or routers are represented as directed edges between the vertices.

The process involves at least two 'passes,' where a 'pass' refers to a traversal of the network topology to determine a set of paths from the source node or vertex representing the network element executing the process.

$1^{st}$ Pass Shortest Path First (SPF) Calculation

The first pass is execution of the normal shortest path Dijkstra algorithm over the network topology graph. The following data is cached for each vertex V in the graph with a shortest path from the source vertex (S), for use in subsequent passes:

(1) First hop edge from source vertex S to vertex V along a shortest path. From this first hop edge, the first hop vertex can be derived as the endpoint of the first hop edge.

(2) Shortest distance from source vertex S to vertex V.

In FIG. 1A, this process is illustrated as a process involving a set of three steps, however one skilled in the art would understand that the process can be implemented as an iterative or similar process that determines shortest path for each vertex V in the network topology graph from the source vertex S and stores (i.e., caches) information with each iteration or through a similar implementation. This process can be executed when a network element is initiated or added to a network. The process can be re-executed in response to topology changes in the network.

The SPF process calculates and stores the shortest path to each vertex in the network topology graph (Block 101). The shortest path is calculated using Djikstra's algorithm or any adequate shortest path first algorithm. With each shortest path to a given vertex V in the network topology, a first hop edge from the source vertex to each vertex V along the respective shortest path is stored or cached for use in the subsequent passes (Block 103). A distance of the shortest path from the source vertex S to each vertex V in the network topology graph is also stored for use in the subsequent passes (Block 107).

$2^{nd}$ Pass LFA

In the second pass, the computation of LFA paths is performed. The next step is to generate a set of initial LFA candidate paths by exploring all paths consisting of the shortest path from the source vertex S to a given shortest path vertex SpVertex joined by (i.e., with the addition of) an edge E originating from SpVertex. The terminating endpoint vertex of the edge E can be referred to as the LfaCandidateVertex. The path formed by joining the edge E to the shortest path to the SpVertex and terminating at LfaCandidateVertex is referred to as a candidate path.

The process illustrated in FIG. 1A, continues by selecting a vertex from the set of vertices in the network topology graph that have not been processed in the second pass (Block 109). The selected vertex is a shortest path vertex (SpVertex) to which an LFA path is to be calculated.

The set of candidate paths is iteratively generated by including each candidate path consisting of a shortest path to the shortest path vertex from the source vertex joined with an edge to an LfaCandidateVertex (Block 111). In each iteration, each of these candidate paths is then and added to a priority queue with two exceptions discussed herein below. The distance along the candidate path is used as priority in the queue, with lower distance interpreted as a higher priority (Block 113). This distance used in the second pass is denoted LFA distance. In one embodiment, as each candidate path is generated a reverse distance from the end vertex (LfaCandidateVertex) of the candidate path is stored or cached for subsequent use (Block 112). The traversal of the vertices (SpVertex) continues until candidate paths have been generated using all the shortest path vertices (Block 114).

The exceptions that are excluded from the priority queue include (1) where the candidate path is looping back to the source vertex. In this case, the distance from the first hop vertex to the source vertex is computed and if it is the shortest distance from the particular first hop vertex then it is stored. This information is crucial when it is determined whether candidate paths are loop free. The second exception is where (2) the first hop edge along this candidate path and the shortest path from the source to LfaCandidateVertex are the same, in which case the candidate path is not a valid protection path.

The next part of the process is a loop which continues until either the priority queue is empty or until LFA paths are identified for all vertices satisfying all applicable conditions. An initial check can be made whether protected paths have been found for all vertices in the network topology (Block 133), if so then the process is complete. Where unprotected vertices remain, a check whether the priority queue is empty is made (Block 135). If the priority queue is not empty, then the process continues to select the next candidate path in the priority queue (Block 115). If the priority queue is empty, then the process can continue to the 'third pass' for rLFA computation (Block 125).

The highest priority candidate, i.e. with the lowest distance, is iteratively selected and removed from the priority queue (Block 115). Then the following conditions are checked, (1) the candidate path is checked to determine whether it meets the loop free condition using cached data from the shortest path first calculation of the first pass and cached data specifying the shortest distance from the first hop vertex back to the source (Block 117), i.e., path_dist(N→LfaCandidateVertex)<opt_dist(N, S)+opt_dist(S, LfaCandidateVertex) where N is the first hop vertex along candidate path from source to LfaCandidateVertex and N→LfaCandidateVertex is the latter part of the candidate path from S to LfaCandidateVertex. If the loop free condition is not met, then the candidate path can be discarded (Block 119).

Additional optional secondary conditions can be checked to determine whether they are met (Block 121). Optional secondary conditions can include node protection condition, i.e. path_dist(N→LfaCandidateVertex)<opt_dist(N, P)+opt_dist(P, LfaCandidateVertex) where N is as above and P is the first hop vertex along the shortest path to LfaCandidateVertex. The optional secondary conditions can include a Shared Risk Link Group (SRLG) condition, which requires that the first hop edge along the shortest path and the candidate path belong to different SRLGs. SRLG membership is an administrative property.

Dependent on the presence of other secondary conditions a first hop vertex to vertex cross path distance condition can be checked. If any optional secondary condition is included, a condition is needed to ensure that a path which is not the shortest path from the candidate paths first hop vertex is excluded. A table keeps track of which vertices have been reached through a path from a certain first hop vertex. By keeping the distance of the path in the table it can be leveraged for the distance computations needed to check the node protection condition.

Another optional secondary condition is the downstream condition, i.e., dist(N→LfaCandidateVertex)<opt_dist(S, LfaCandidateVertex) with notation as above. Other optional conditions can be included in the secondary conditions. Any mechanism can be used to qualify a path. For example, certain paths or vertices may be avoided. Another condition to be checked is that a protection is not already selected to LfaCandidateVertex. Depending on the fulfillment of the above conditions the following actions are performed according to Table 1.

PRUNE: no action, continue with next candidate path. That is the candidate path is discarded and the next candidate path is processed. ADD-PATH: the candidate path is selected as the LFA path. RELAX-EDGES: new candidate paths are generated from the candidate path to LfaCandidateVertex by adding any one of the edges originating from LfaCandidateVertex.

TABLE 1

| Condition | Action |
| --- | --- |
| Loop Free Condition Fails | PRUNE |
| Node protection fails with strict inequality | PRUNE |
| Node protection fails with equality when SRLG, Downstream or Other condition applicable | RELAX-EDGES |
| Node protection fails with equality when neither SRLG, Downstream nor Other condition applicable | PRUNE |

TABLE 1-continued

| Condition | Action |
| --- | --- |
| First hop vertex to vertex cross path distance already exists. | PRUNE |
| SRLG condition fails | RELAX-EDGES |
| Downstream condition fails | RELAX-EDGES |
| Other condition fails | RELAX-EDGES |
| Condition that no protection path has been selected to LfaCandidateVertex fails | RELAX-EDGES |

So only failure to satisfy loop free condition, failure of the node protection condition or the first hop vertex to vertex cross path condition will prevent the relaxation of the edges. In all cases, if all conditions are fulfilled then both ADD-PATH and RELAX-EDGES actions will be performed. Thus, when the secondary conditions are checked (Block 121), the process can relax edges by adding the new candidate path(s) to the priority queue by joining one of the edges to the end of the candidate path (i.e., at LfaCandidateVertex) (Block 123). After the edges are relaxed, the process continues to select the next candidate path (Block 115). If the candidate path fails the loop free condition or secondary conditions that indicate pruning, then the candidate path is discarded or pruned (Block 119). If the applicable conditions are met, then the candidate path can be selected as the LFA path for the vertex (SpVertex) (Block 125). However, in some embodiments a check is made to ensure that the candidate path end vertex (LfaCandidateVertex) is not already protected (Block 141). If it is already protected, then the candidate path is discarded (Block 119).

The following data is cached per vertex for which an LFA path has been selected and stored (Block 125). The following data can be stored or cached for use in subsequent calculations, (1) first hop edge along LFA path from source to vertex (Block 127), (2) the LFA distance along LFA path from source to the SpVertex (Block 129), and (3) the distance from the LfaCandidate vertex to the source vertex, this distance is found and recorded when a prospective candidate path is leading back to the source. It is needed for the validation of the loop-free condition in the third pass. This cached data is used in the third pass, which is for the calculation of a remote LFA for each vertex.

In addition the shortest distance between two nodes that are both reachable over a single edge from the source is learned when such paths can be derived from candidate paths. This data is needed to check the optional condition for guaranteeing node failure protection. If only the loop free condition is required and no other conditions, then it is not necessary to learn these distances.

After an LFA path is selected and the appropriate data cached, the process can continue to select a next candidate path (Block 115) where the priority queue is not empty (Block 135) and vertices remain to be protected (Block 133). In some embodiments, new candidate paths can be generated and added (Block 123) before these checks are made and the next candidate path is selected.

Similarly, where a pruning occurs and the candidate path is discarded (Block 119), the process continues by checking whether any further vertices remain without a protected path (Block 133) and candidate paths remain in the priority queue (Block 135). If there are remaining candidate paths and at least on vertex without a protection path, then the process continues by selecting the next candidate path (Block 115).

3$^{rd}$ Pass Remote LFA

Figure 1B:
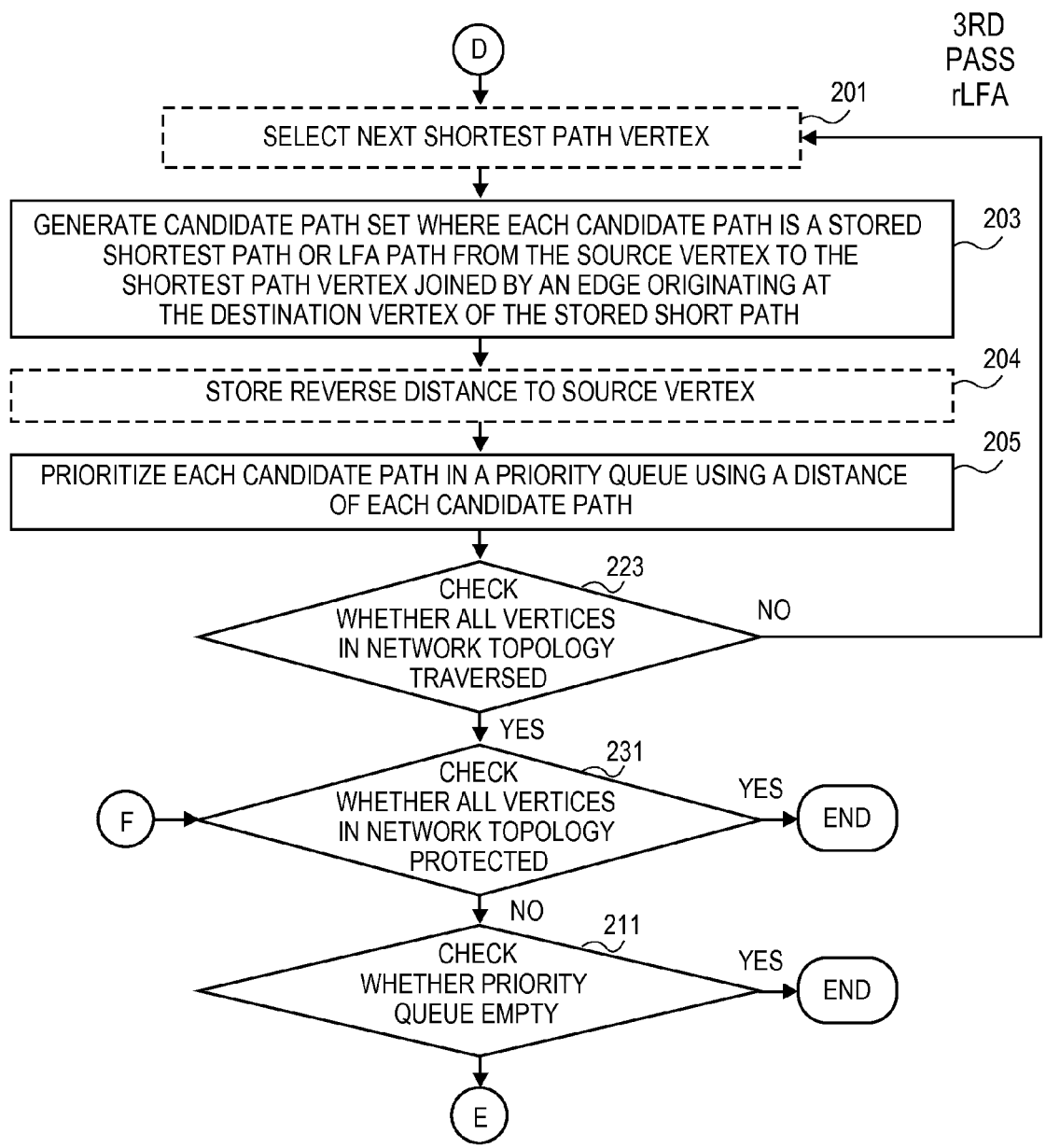
FIG. 1B is a diagram of one embodiment of a process for optimized remote LFA (rLFA) backup path calculation.
Figure 1B:
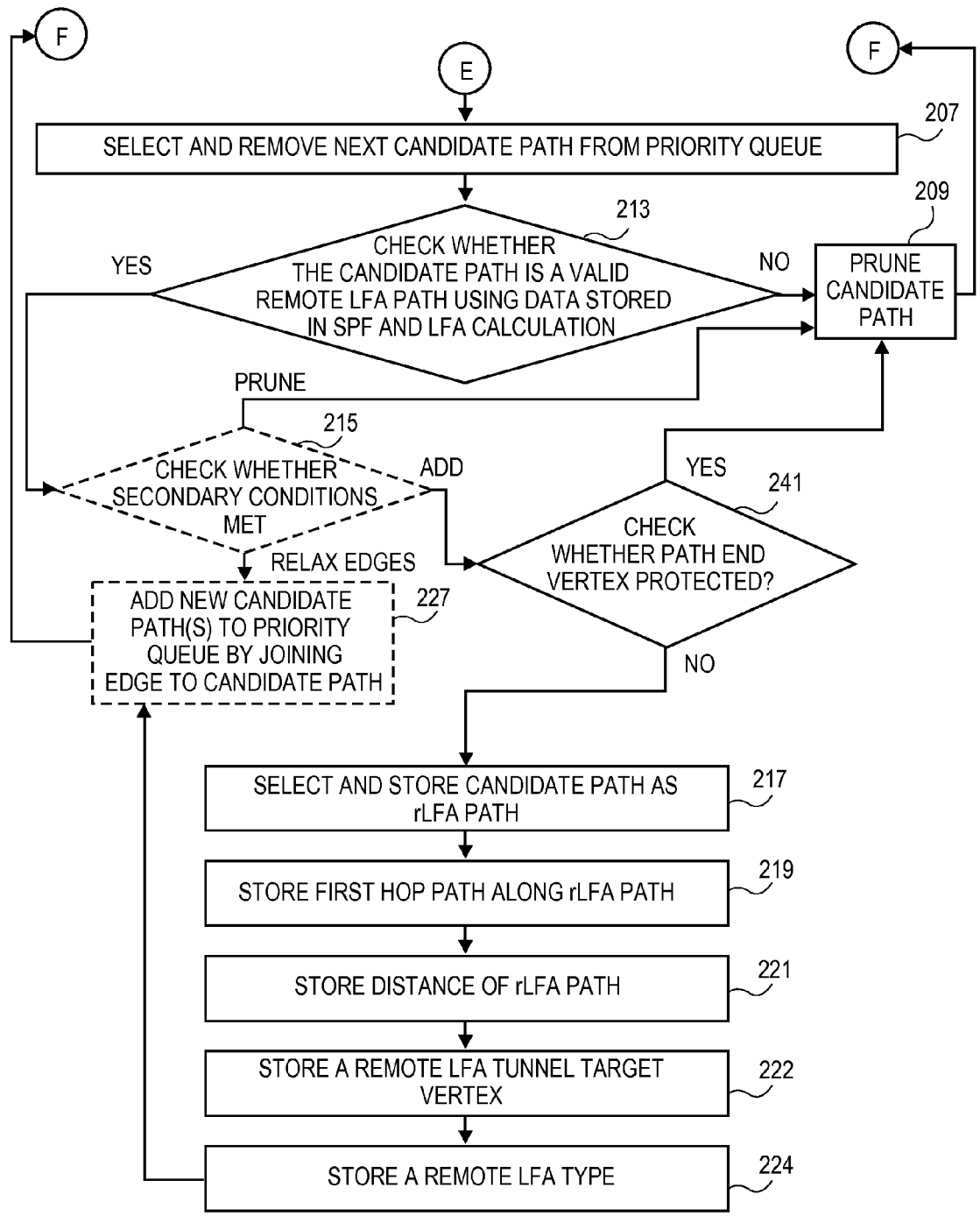

As illustrated in FIG. 1B, the third pass for computation of remote LFA paths is similar to the second pass where the LFA path is calculated. For each candidate remote LFA path, the remote LFA distance is recorded and the candidates are put into a data structure, e.g. a priority queue, ordered on remote LFA distance. All such paths make up the initial remote LFA candidates. Next a loop is entered in which the candidate path of smallest remote LFA distance is extracted. If additional conditions are required, e.g. node protection, downstream, shared link group, they are checked before determining if the candidate is accepted as best remote LFA path. Next new candidates are generated using edges originating from the candidate vertex at the end of the LFA path. The loop-free and first edge conditions are checked for new prospective candidates. The loop terminates when either there are no more candidates, or an LFA or remote LFA paths have been found for all vertices in the network topology graph.

The next step consists of generating a set of initial remote LFA candidates by iteratively selecting a vertex (SpVertex) in the network topology (Block 201) generating a candidate path in each iteration that is a shortest path to the selected vertex joined by an edge originating at the end vertex of the shortest path (Block 203). As in the second pass where the LFA paths were calculated, one case is the exploration of paths consisting of the shortest path from the source vertex to a shortest path vertex SpVertex joined by an edge E originating from the SpVertex. The difference in the third pass is that remote LFA is based on a tunnel from the source vertex to SpVertex. The remote LFA loop-free condition is therefore different and will in general allow for protection of additional nodes compared to normal LFA. For the third pass the set of LFA paths from the source vertex to a vertex (LfaVertex) joined by an edge E originating from the LFA vertex, is also explored to generate candidate remote LFA paths. Prospective remote LFA path candidates comprised of a shortest paths or LFA paths from the source vertex to a tunnel target vertex and an edge E originating from the tunnel vertex targeting an rLfaCandidateVertex is a candidate remote LFA path.

The candidate paths are added to a priority queue with the exception of scenarios where the edge E terminates back at the source vertex, in which case the distance to the source from the tunnel target vertex is evaluated and if it is the smallest distance from the tunnel target vertex to the source vertex then it is stored. The second exception is where the first hop edge along this candidate path and the shortest path from the source to rLfaCandidateVertex are the same. The distance along the candidate path is used as priority for ordering the candidate paths in the priority queue (Block 205), with lower distance interpreted as a higher priority. This distance used in third pass is referred to as the Remote LFA distance. Candidate paths are iteratively added to the priority queue until all vertices in the network topology have been traversed (Block 223). In one embodiment, if the candidate path leads back to the source vertex then a reverse distance from the tunnel target vertex to the source vertex is stored or cached (Block 204).

The process then defines an iterative loop for processing these candidate paths that continues until the priority queue for remote LFA candidates is empty (Block 211) and/or protection paths, either LFA or remote LFA, are identified for all vertices, satisfying all applicable conditions (Block 231). The highest priority candidate, i.e. with the lowest distance, is selected and removed from the priority queue (Block 207) Then a set of conditions are checked for the selected candidate path. A loop free condition for remote LFA path is check, i.e., path_dist(rLfaTunnelTargetVertex→rLfaCandidate Vertex)<opt_dist(rLfaTunnelTargetVertex, S)+opt_dist(S, rLfaCandidateVertex) where S is the source vertex (Block 213). This loop free condition can utilize data stored during the SPF, LFA or rLFA candidate path calculations. If the rLFA path condition is not met, then the candidate path can be pruned or discarded (Block 209) and the process can continue by checking whether there are additional candidate paths in the priority queue (Block 211) and whether there are additional vertices to traverse (Block 223) in which case a next candidate path (Block 207).

A set of secondary conditions can be checked (Block 215) in addition to the rLFA path condition as configured by an administrator. One optional condition is a node protection condition, i.e. path_dist(rLfaTunnelTargetVertex→ rLfaCandidateVertex)<opt_dist(rLfaTunnelTargetVertex, P)+opt_dist(P, rLfaCandidateVertex) where P is the first hop vertex along the shortest path to the rLfaCandidateVertex. A condition that is contingent on other optional conditions is the rLfaTunnelTargetVertex to vertex cross path distance condition. If any optional condition is included, a condition is needed, to ensure that a path which is not the shortest path from the rLfaTunnelTargetVertex is excluded. A table keeps track of which vertices have been reached through a path from a certain rLfaTunnelTargetVertex. By keeping the distance of the path in the table it can be leveraged for the distance computations needed to check the node protection condition.

A further optional condition is a Shared Risk Link Group (SRLG) condition, which requires that the first hop edge along the shortest path and the candidate path belong to different SRLGs. SRLG membership is an administrative property. A link condition can be used to assure that the first hop of the shortest path and the remote LFA path are different. Another optional condition is the downstream condition, i.e., dist(N→LfaCandidateVertex)<opt_dist(rLfaTunnelTargetVertex, LfaCandidateVertex). Any number or combination of conditions can be defined and implemented by the process within the secondary conditions. In one embodiment, a final condition can be to check that a protection is not already selected to theLfaCandidateVertex. Depending on fulfillment of the above conditions the following actions can be performed as described in Table 2. The actions include, PRUNE: no action, continue with next candidate path; ADD-PATH: the candidate path is chosen; RELAX-EDGES: new candidate paths are generated from the candidate path to rLfaCandidateVertex by adding any one of the edges originating from rLfaCandidateVertex.

TABLE 2

| Condition | Action |
| --- | --- |
| Loop Free Condition Fails | PRUNE |
| Node protection fails with strict inequality | PRUNE |
| Node protection fails with equality when SRLG, Downstream or Other condition applicable | RELAX-EDGES |
| Node protection fails with equality when neither SRLG, Downstream nor Other condition applicable | PRUNE |
| rLfaTunnelTargetVertex to vertex cross path distance already exists. | PRUNE |
| SRLG condition fails | RELAX-EDGES |
| Link Condition fails | RELAX-EDGES |
| Downstream condition fails | RELAX-EDGES |

TABLE 2-continued

| Condition | Action |
| --- | --- |
| Other condition fails | RELAX-EDGES |
| Condition that no protection path has been selected to rLfaCandidate Vertex fails | RELAX-EDGES |

Failure to satisfy the loop free condition or node protection condition will prevent the relaxation of the edges and the process will prune the candidate path (Block 209), before selecting the next candidate path if the priority queue is not empty (Block 211) and all vertices are not protected (Block 223).

If all conditions are fulfilled then ADD-PATH and/or RELAX-EDGES actions can be performed. Relaxing the edges adds new candidate paths to the priority queue by joining an edge to a candidate path, for any edge originating from the rLfaCandidateVertex (Block 227). The following data is cached per vertex for which an rLFA path has been found selected and recorded (Block 217), a first hop edge along remote LFA path from source vertex to the rLfaCandidate vertex (Block 219), a distance along the remote LFA path from source vertex to the rLfaCandidate vertex (Block 221), rLFATunnelTargetVertex (Block 222), the type of the remote LFA path (Block 224) being of either 'shortest path' or 'LFA' type and a distance from rLFATunnelTargetVertex to the source vertex; this distance is found and recorded when a prospective candidate is leading back to the source vertex. It is needed for the validation of the loop-free condition. In one embodiment, the shortest distance between rLFATunnelTargetVertex and an additional vertex are stored. This data is needed to check the optional condition for guaranteeing node failure protection. After this data is stored or cached the process can continue to check the priority queue (Block 211) and node protection (Block 231) before selecting the next candidate path. In other embodiments, the process adds new candidate paths (Block 227).

Proof of the Validity of the Process

The paths generated by the process described herein are valid in the sense that traffic sent on a protection path will reach the destination, given that, with the exception of the source vertex, vertices are forwarding traffic using a shortest path to the destination vertex.

The same argument applies to both a generated second pass normal LFA and a third pass remote LFA path. What needs to be shown is that the second part of the path, i.e., the path from the first hop vertex in the LFA case, and the path from the rLFATunnelTargetVertex in the remote LFA case, is a shortest path. Because all conditions are valid for a path since the process explicitly verifies them before selecting a candidate path as a backup (LFA or rLFA) path.

To show this, consider the LFA case, assume S-P→X is a shortest path from S to X where P is the first hop vertex. Assume S-Q→X is the protection path (LFA path) selected by the process, where Q is the first hop vertex along the LFA path. This LFA path satisfies all applicable conditions. In particular the LFA path satisfies the loop free condition since it is a mandatory condition for the process. Assume P1: Q→X part of the LFA path is not a shortest path from Q to X. Let P2: Q→X be a shortest path from Q to X. Since P1 is not a shortest path, opt_dist(P2:Q→X)<path_dist(P1: Q→X).

Since the process did not select path P2 as the LFA path and since it is shorter than P1, it is concluded that the method must have pruned the protection path based on P2 for some vertex of path P2:Q→X, say Q→Y was pruned. If there are multiple shortest paths Q→X we pick P2 to be a path among them which is maximal in the sense that no other shortest path Q→X contain Y and is not pruned at Y, but at a vertex Z beyond Y. The process prunes based on three different conditions. The three conditions all leads to contradictions therefore the process is proven.

First, if S-Q→Y is not loop free then it is easy to check that S-Q→X is not loop free neither using P1 nor P2. This contradicts the fact that P1 was selected by the method.

Second, if S-Q→Y fails the node protection condition with strict inequality, then Q→Y and Q→X are not shortest paths, because Q→P→Y and Q→P→X are shorter.

Third, if pruning was due to the first hop vertex to vertex cross condition failing, then there is another path P3:Q→X through Y which is pruned beyond Y. This contradicts the maximal condition based on which path P2 was selected.

Since all possible reasons for pruning lead to contradictions, it is concluded that P1 is a shortest path. A completely analogous argument proves that a remote LFA path S=>T→X generated by the process with T a remote LFA tunnel target vertex, then T→X is a shortest path.

Figure 2:
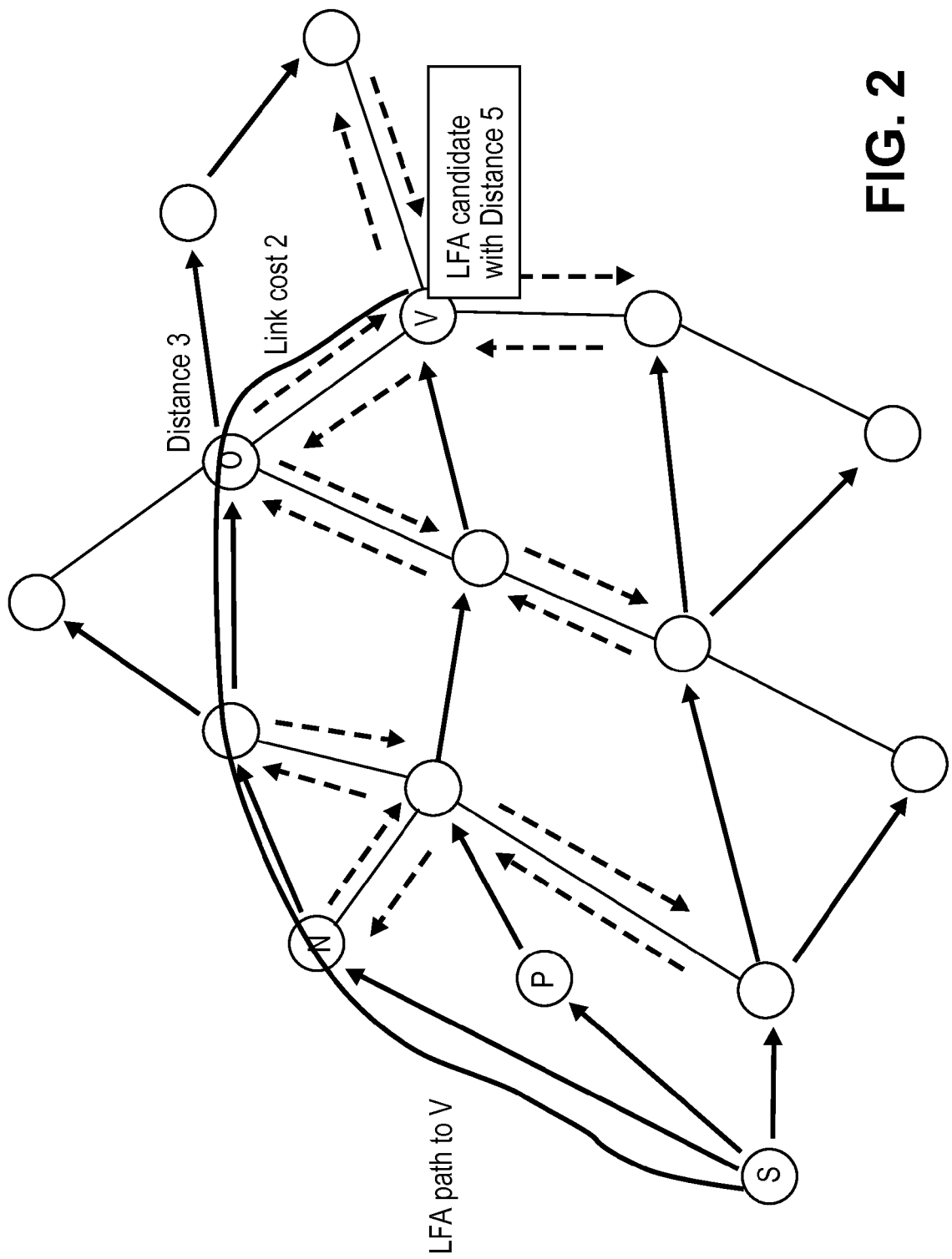
FIG. 2 is a diagram of one embodiment of a network element to execute the optimized LFA and rLFA backup path calculation.

FIG. 2 is a diagram of one embodiment of an example topology and network element configuration demonstrating calculation of a candidate LFA backup path. The shortest path from S to U of distance 3 is joined by the edge from U to V of cost 2 to form a candidate LFA backup path of distance 5.

Figure 3:
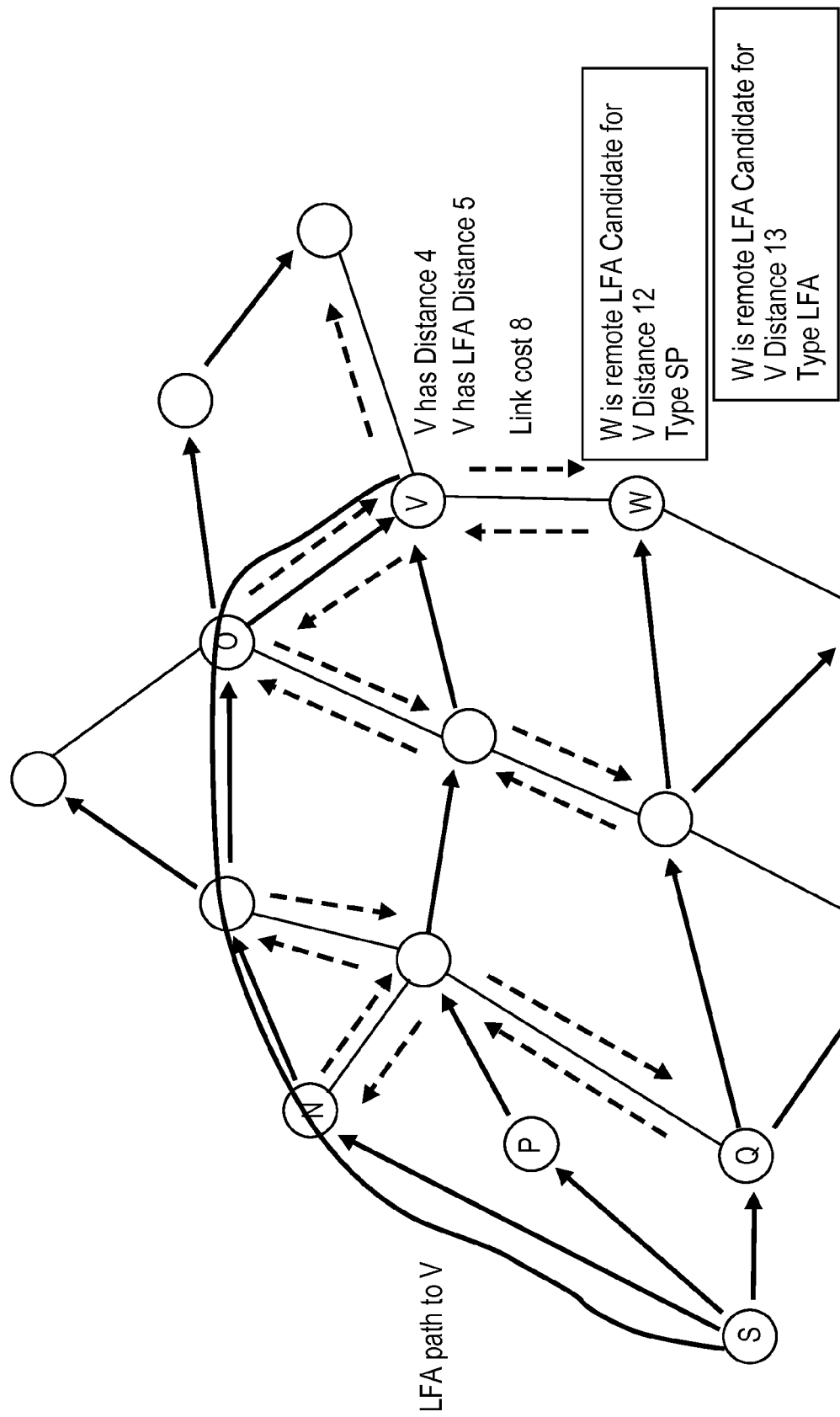
FIG. 3 is a diagram of one embodiment of an example topology and network element configuration demonstrating calculation of the LFA backup path.

FIG. 3 is a diagram of one embodiment of an example topology and network element configuration demonstrating calculation of rLFA backup paths. The shortest path from S to V of distance 4 is joined by the edge from V to W of cost 8 to form a candidate remote LFA path. Similarly the LFA path from S to V of distance 5 is joined by the same edge from V to W to form a candidate remote LFA path of distance 13.

Figure 4:
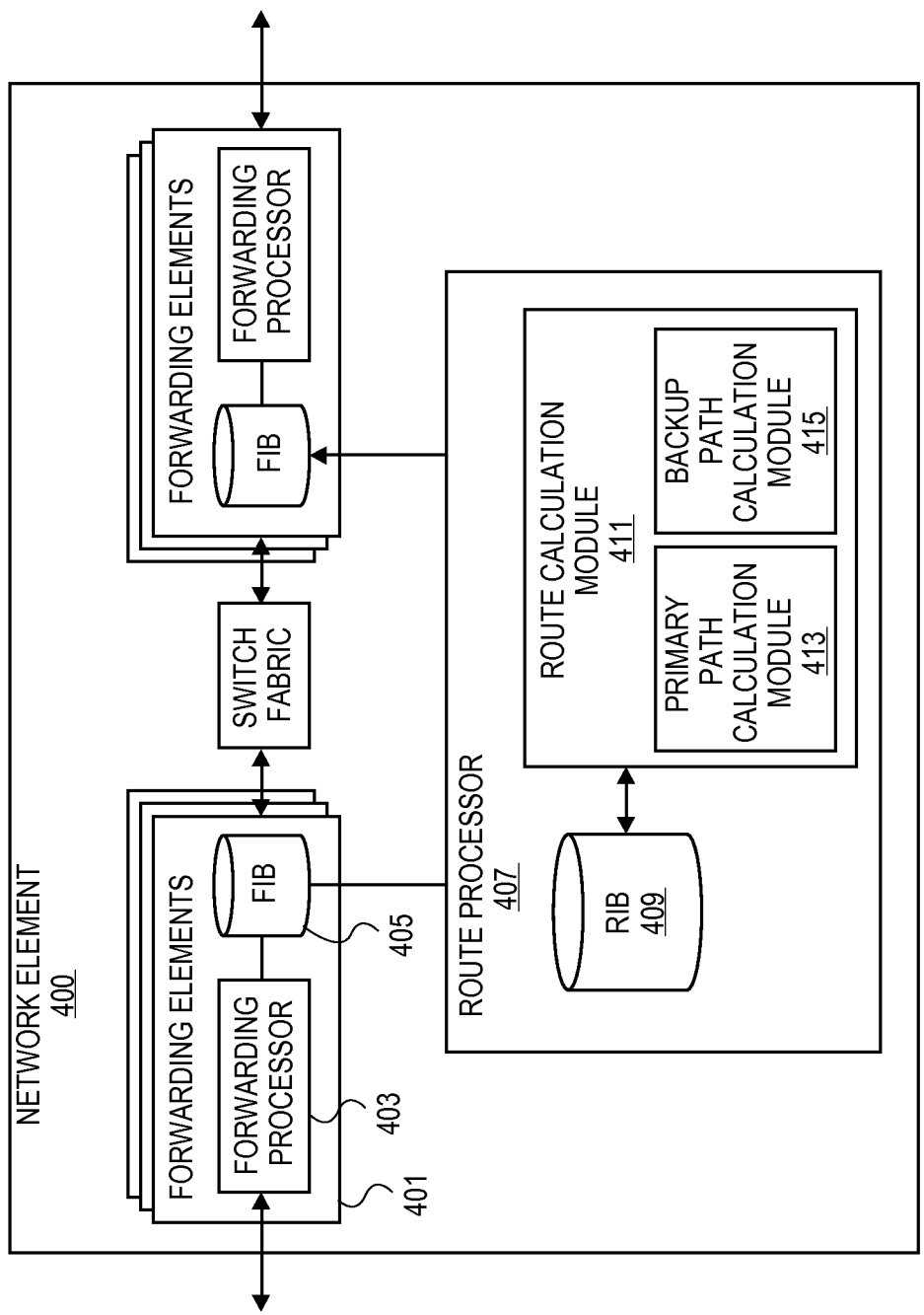
FIG. 4 is a diagram of one embodiment of an example topology and network element configuration demonstrating calculation of the rLFA backup path.

FIG. 4 is a diagram of one embodiment of a network element to execute the optimized LFA and rLFA backup path calculation. The network element 400 is provided by way of example, rather than limitation. One skilled in the art would understand that other network elements with differing configuration can implement the process described herein. In the example embodiment, the network element 400 includes a route processor 407 and a set of forwarding elements 401. The forwarding elements can be connected by an interconnect such as a switch fabric or similar interconnect allowing transfer of the data packets from one forwarding element to another. Similarly, the route processor 407 can be connected to each of the forwarding elements 401 through the same or a different set of interconnects such that the network processor can exchange data and configure the forwarding elements 401.

In one embodiment, the forwarding elements 401 can be line cards or similar components of a network element. The network element 400 can include any number of forwarding elements 401. The forwarding elements 401 can receive and forward data traffic over any number of communication links or ports. The forwarding element 401 can include a forwarding processor that processes each inbound and outbound data packet to identify how to forward the data packet toward its destination by identifying a next hop for the data packet using information stored in the forwarding information base 405. The forwarding element 401 matches the destination address and other data of the data packets with the information in the forwarding information base 405 to identify the next hop for the data packet. The forwarding processor 401 then forwards the data packet over the corresponding port or communication link or sends the data packet to another forwarding element 401 over the switch fabric that is attached to the next hop port or communication link.

In one embodiment, the route processor 407 can manage the programming of the forwarding information base 405 using the route information base 409. The route processor 407 can manage other control plane functions of the network element 400 as well. The route information base 409 contains information regarding the topology of the network in which the network element 400 resides. The route information base 409 can be updated and maintained using any type of discovery protocol or similar control plane protocol.

In one embodiment, the route processor 407 also contains a primary path calculation module 413 that processes the information of the route information base 409 to identify the primary and back paths in support of FRR or similar protection schemes. The primary path calculation module 413 can execute a shortest path first (SPF) calculation algorithm or similar algorithm to determine a path to each of the nodes in the network. This SPF calculation is utilized to program the next hops for each destination node in the forwarding information base 405 of the forwarding elements 401. Similarly, the backup path calculation module 415 implements the backup path identification process described herein above using an efficient process to calculate backup paths using cached data from the SPF calculation and previous iterations of the LFA and rLFA calculations for all the vertices of the network topology graph that represents the network of the network element, such that next hops for the backup LFA paths for all vertices (i.e., nodes) in the network topology graph can be programmed into the forwarding information base 405 of the forwarding elements 401.

Figure 5:
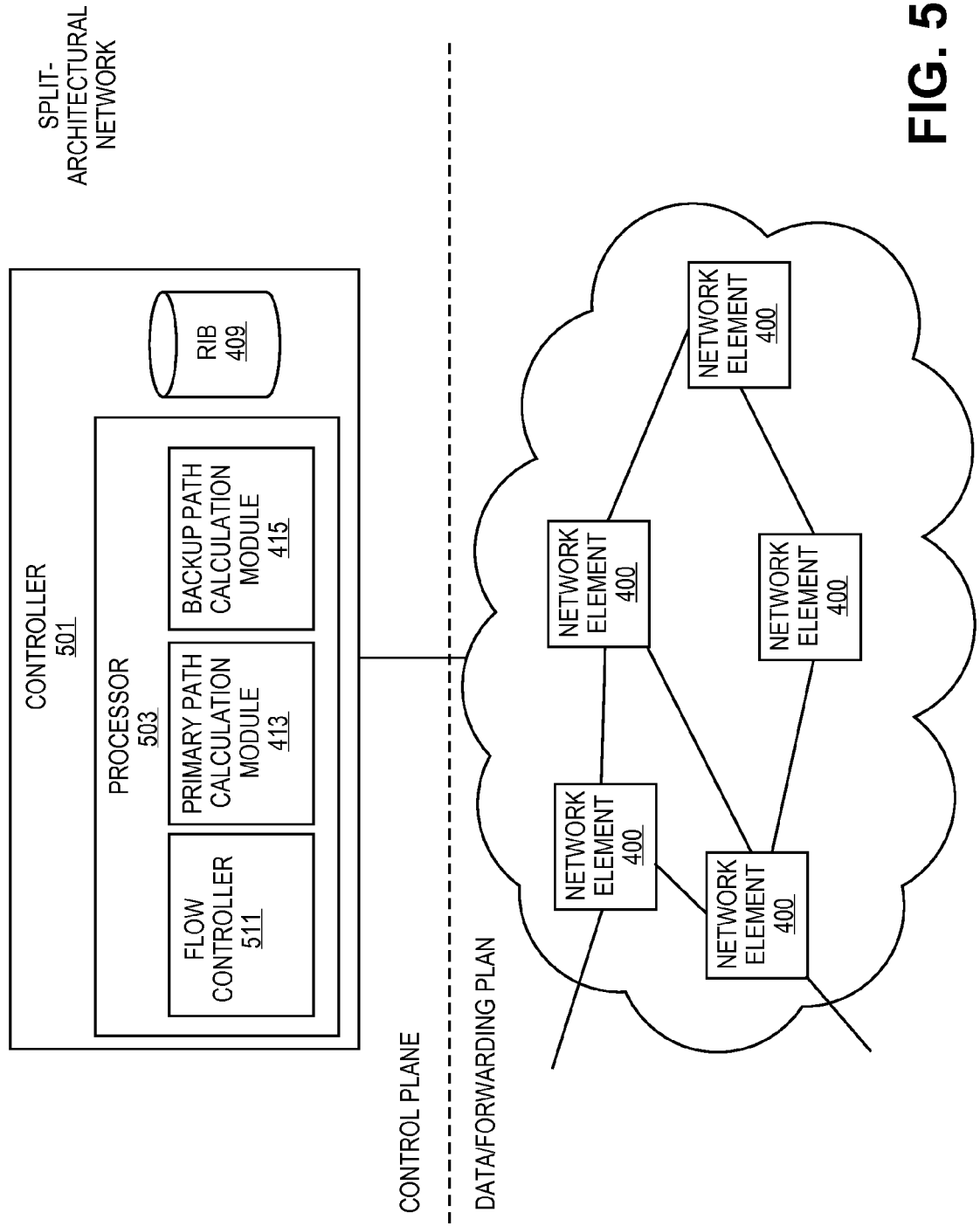
FIG. 5 is a diagram of one embodiment of a split-architecture implementation of the process.

FIG. 5 is a diagram of one embodiment of a split-architecture implementation of the process. In one embodiment, the process is implemented by a controller 501 in a split-architecture, rather than at the network element 400. The controller 501 manages the control plane functionality of the network, while the network elements 400 implement the data/forwarding plane aspects of the network. Thus, the network elements 400 include the forwarding elements and forwarding information base as described above. However, the control plane functions have been removed to a remote controller 501 that can be at any location relative to the network in which the network elements 400 are situated such that the controller is in communication with each of the network elements 400.

The controller 501 can include a processor to execute the primary path calculation module 413 and the backup path calculation module 415. These functions can be implemented by a single processor 503 or a set of processors distributed over any number of devices implementing the controller 501. For sake of clarity an example with a single device and processor is described. The path calculation modules can utilize the route information base 409 that is also maintained locally or at a location in communication with the processor 503.

A flow controller 511 can implement any flow control protocol to enable the controller to communicate and configure the network elements 400 in the network, including the configuration of primary and backup paths. In one example embodiment, the flow controller 511 can communicate and configure the flow control elements of the network elements 400 using the OpenFlow protocol. One skilled in the art would understand that any similar flow control protocol can be utilized that enables the controller to configure the network elements and control the data plane of the network.

Use Cases

The process described herein above is directly applicable to interior gateway protocol (IGP) and label distribution protocol (LDP) routing where the topology of a routing domain is learned by each router within the domain. If a router address is an internet protocol (IP) subnet, then the shortest path and protection path computed for that router are applicable to that IP subnet. In a case where an IP subnet is advertised by multiple routers, an extra level of logic is needed to determine which backup path is to be used.

LDP may be applied to set-up multi-protocol label switching (MPLS) label switched paths (LSP paths) along the paths computed by IGP. LDP may also be applied to enable the tunneling used by remote LFA repair paths computed by IGP using the above process. One skilled in the art would understand that the process can be adapted and applied to similar networking architectures and protocols.

The foremost advantage provided by the process described herein above is improved computational efficiency. As an example, in a big network on the order of 1000 routers, if a router has 100 neighbors and the normal shortest path computation takes 10 ms, then the computation time needed for the standard algorithm is on the order of 1 second whereas the embodiments of the invention provide a convergences on the order of 10's of ms.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method implemented by a first network device to improve efficiency of loop free alternative (LFA) path computation by caching data from a shortest path first calculation for use in the LFA path calculation, the shortest path first calculation to determine a shortest path from a source vertex representing the first network device to each vertex in a network topology graph representing a plurality of network devices in a network in which the first network device operates, where an endpoint for each shortest path is a shortest path vertex representing a second network device in the network, where each shortest path determined by the shortest path first calculation is stored, the method comprising the steps of:
   generating a candidate path set with each candidate path being a stored shortest path from a source vertex, the first network device, to the shortest path vertex, the second network device, with an addition of a link originating at the shortest path vertex of the stored shortest path to a neighbor node of the shortest path vertex representing a third network device in the network;
   prioritizing each candidate path in a priority queue using a distance of each candidate path;
   selecting and removing a next candidate path from the priority queue;
   checking whether the candidate path is a loop free alternative path using stored data from the shortest path first calculation;
   discarding the candidate path where the candidate path is not a loop free alternative path;
   where the candidate path meets applicable conditions,
      selecting the candidate path as the LFA path,
      storing the candidate path as the LFA in the first network device to be a backup path to the second network device in the network represented by the shortest path vertex in the network;
      storing the first hop edge along the LFA path,
      storing a distance of the LFA path;
   checking whether the priority queue is empty;
   checking whether all shortest path vertices in the network topology have LFA paths; and
   ending the LFA path calculation when the priority queue is empty or all shortest path vertices have LFA paths.

2. The method of claim 1, further comprising the step:
   checking a set of secondary conditions in combination with the checking of the candidate path to be a loop free alternative path.

3. The method of claim 2, wherein checking the set of secondary conditions further comprises the step of:
   checking a node protection condition to determine a validity of a candidate path as a node protecting path.

4. The method of claim 3, wherein checking the node protection condition further comprises the step of:
   calculating a shortest distance from a first hop vertex to the end of a candidate path.

5. The method of claim 2, wherein checking the set of secondary conditions further comprises the step of:
   determining validity of candidate path based links of the candidate path being part of different administratively assigned protection group than the shortest path.

6. The method of claim 2, further comprising the steps of:
   generating another candidate path set with each candidate path being a stored shortest path, or the LFA path, joined with an edge originating at the shortest path vertex of the stored shortest path;
   prioritizing each candidate path in a priority queue using a distance of each candidate path;
   selecting and removing a next candidate path from the priority queue;
   checking whether the candidate path is a remote loop free alternative path using stored data from the shortest path first calculation and LFA path calculation;
   discarding the candidate path where the candidate path is not a remote loop free alternative path;
   where the candidate path meets applicable conditions,
      selecting and storing the candidate path as the remote LFA path,
      storing the first hop edge along the remote LFA path,
      storing a distance of the remote LFA path,
      storing a remote LFA tunnel target vertex
      storing a remote LFA type;
   checking whether the priority queue is empty;
   checking whether all shortest path vertices in the network topology have LFA paths; and
   ending the LFA path calculation when the priority queue is empty or all shortest path vertices have LFA paths.

7. The method of claim 6, further comprising the step of:
   calculating a second set of secondary conditions.

8. The method of claim 7, wherein calculating the second set of secondary conditions further comprises the step of:
   determining a shortest distance from a remote LFA tunnel target vertex back to the source vertex for use in calculation of the loop free condition of the remote LFA path.

9. The method of claim 7, wherein calculating the second set of secondary conditions further comprises the step of:
   determining a validity of a remote LFA path based links of the remote LFA path being part of different administratively assigned protection group compared to the links of the shortest path.

10. The method of claim 7, wherein calculating the second set of secondary conditions further comprises the step of:
    determining a shortest distance from a remote LFA tunnel target vertex to a source vertex for use of in evaluation of node protection condition of remote LFA paths.

11. A first network device executing a method to improve efficiency of loop free alternative (LFA) path computation by caching data from a shortest path first calculation for use in the LFA path calculation, the shortest path first calculation to determine a shortest path from a source vertex representing the first network device to each vertex in a network topology graph representing a plurality of network devices in a network in which the first network device operates, where an endpoint for each shortest path is a shortest path vertex representing a second network device in the network, where each shortest path determined by the shortest path first calculation is stored, the network device comprising:

at least one forwarding element to forward data traffic along a primary path until a network event and to forward the data traffic along a backup LFA path after the network event;

a route processor coupled to the at least one forwarding element, the route processor configured to execute a primary path calculation module and a backup path calculation module, the backup path calculation module configured to generate a candidate path set with each candidate path being a stored shortest path from a source vertex, the first network device, to the shortest path vertex, the second network device, with an addition of a link originating at the shortest path vertex of the stored shortest path to a neighbor node of the shortest path vertex representing a third network device in the network, to prioritize each candidate path in a priority queue using a distance of each candidate path, to select and removing a next candidate path from the priority queue, to check whether the candidate path is a loop free alternative path using stored data from the shortest path first calculation, to discard the candidate path where the candidate path is not a loop free alternative path, where the candidate path meets applicable conditions, to select the candidate path as the LFA path, to store the candidate path as the LFA in the first network device to be the backup LFA path to the second network device in the network represented by the shortest path vertex in the network, to store the first hop edge along the LFA path, to store a distance of the LFA path, the backup path module further configured to check whether the priority queue is empty, to check whether all shortest path vertices in the network topology have LFA paths, and to end the LFA path calculation when the priority queue is empty or all shortest path vertices have LFA paths.

12. The network device of claim 11, wherein the route processor is further configured to check a set of secondary conditions in combination with the checking of the candidate path to be a loop free alternative path.

13. The network device of claim 12, wherein the route processor is further configured to check a node protection condition to determine a validity of a candidate path as a node protecting path.

14. The network device of claim 13, wherein the route processor is further configured to calculate a shortest distance from a first hop vertex to the end of the candidate path.

15. The network device of claim 12, wherein the route processor is further configured to determine validity of candidate path based links of the candidate path being part of different administratively assigned protection group than the shortest path.

16. The network device of claim 12, wherein the route processor is further configured to generate another candidate path set with each candidate path being a stored shortest path, or the LFA path, joined with an edge originating at the shortest path vertex of the stored shortest path, to prioritize each candidate path in a priority queue using a distance of each candidate path, to select and removing a next candidate path from the priority queue, to check whether the candidate path is a remote loop free alternative path using stored data from the shortest path first calculation and LFA path calculation, to discard the candidate path where the candidate path is not a remote loop free alternative path, where the candidate path meets applicable conditions, to select and to store the candidate path as the remote LFA path, to store the first hop edge along the remote LFA path, to store a distance of the remote LFA path, to store a remote LFA tunnel target vertex, to store a remote LFA type, the router processor further configured to check whether the priority queue is empty, to check whether all shortest path vertices in the network topology have LFA paths, and to end the LFA path calculation when the priority queue is empty or all shortest path vertices have LFA paths.

17. The network device of claim 16, wherein the route processor is further configured to perform a validation of a second set of secondary conditions.

18. The network device of claim 17, wherein the route processor is further configured to determine a shortest distance from a remote LFA tunnel target vertex back to the source vertex for use in calculation of the loop free condition of the remote LFA path.

19. The network device of claim 17, wherein the route processor is further configured to determine a validity of a remote LFA path based links of the remote LFA path being part of different administratively assigned protection group compared to the links of the shortest path.

20. The network device of claim 17, wherein the route processor is configured to determining a shortest distance from a remote LFA tunnel target vertex to a source vertex for use of in evaluation of node protection condition of remote LFA paths.

* * * * *

UNITED STATES PATENT AND TRADEMARK OFFICE
CERTIFICATE OF CORRECTION

PATENT NO. : 9,253,079 B2
APPLICATION NO. : 14/052414
DATED : February 2, 2016
INVENTOR(S) : Ernström et al.

Page 1 of 1

It is certified that error appears in the above-identified patent and that said Letters Patent is hereby corrected as shown below:

In the Claims

In Column 16, Line 39, in Claim 6, delete "vertex" and insert -- vertex, --, therefor.

Signed and Sealed this
Third Day of May, 2016

Michelle K. Lee
*Director of the United States Patent and Trademark Office*